United States Patent
Cranfill et al.

(10) Patent No.: US 7,129,824 B2
(45) Date of Patent: Oct. 31, 2006

(54) TACTILE TRANSDUCERS AND METHOD OF OPERATING

(75) Inventors: David B. Cranfill, Sparta, NJ (US); Sandra J. Guzman, Berwyn, IL (US); Scott K. Isabelle, Waukegan, IL (US); Rindala Saliba, West Windsor, NJ (US)

(73) Assignee: Motorola Inc., Schaumburg, IL (US)

( * ) Notice: Subject to any disclaimer, the term of this patent is extended or adjusted under 35 U.S.C. 154(b) by 389 days.

(21) Appl. No.: 10/651,133

(22) Filed: Aug. 28, 2003

(65) Prior Publication Data

US 2005/0046551 A1  Mar. 3, 2005

(51) Int. Cl.
*H04B 3/36* (2006.01)

(52) U.S. Cl. .................. 340/407.1; 340/7.6; 455/567; 434/114

(58) Field of Classification Search .............. None
See application file for complete search history.

(56) References Cited

U.S. PATENT DOCUMENTS

| 5,327,120 | A | * | 7/1994 | McKee et al. | 340/7.6 |
|---|---|---|---|---|---|
| 5,473,315 | A | * | 12/1995 | Holroyd | 340/683 |
| 5,546,069 | A | * | 8/1996 | Holden et al. | 340/407.1 |
| 5,857,986 | A | * | 1/1999 | Moriyasu | 601/49 |
| 2002/0080112 | A1 | * | 6/2002 | Braun et al. | 345/156 |
| 2003/0222766 | A1 | * | 12/2003 | Rollins et al. | 340/407.1 |
| 2004/0209654 | A1 | * | 10/2004 | Cheung et al. | 455/567 |
| 2005/0036636 | A1 | * | 2/2005 | Noro et al. | 381/124 |

* cited by examiner

*Primary Examiner*—Benjamin C. Lee
(74) *Attorney, Agent, or Firm*—Randall S. Vaas

(57) ABSTRACT

A portable electronic device (100) includes a vibrating transducer having a resilient support and a first mass supported by the first resilient support forming a mechanical resonator, and an electrical circuit coupled to the first vibrating transducer to apply a drive signal. A plurality of tactile vibration transducers (130, 140) can work in unison to produce strong tactile stimulus (216, 228, 230).

4 Claims, 10 Drawing Sheets

TACTILE TRANSDUCERS AND METHOD OF OPERATING

FIELD OF THE INVENTION

The present invention relates in general to tactile transducers and methods of driving the same. More particularly, the present invention relates to tactile transducers for use in handheld devices.

BACKGROUND OF THE INVENTION

Cellular phones are a ubiquitous sight in today's societies. Presently there is an interest in enhancing the functionality and user experience in using portable electronic apparatus such as cellular telephones. To that end various steps toward making portable electronic devices multimedia capable, such as the introduction of color screens, adding electronic cameras, and enhancing wireless network bandwidth, have been undertaken.

One area in which efforts have been made to improve the user's experience, is audio quality and tactile stimulation. Tactile stimulation is related to audio in the sense that low frequency tactile stimulation can be used as a surrogate for low frequency audio, which would be difficult to generate using a small size limited power system that can be built into a portable device.

Both audio, and tactile stimulation can be provided by a single device known as a multi-function transducer (MFT). Certain types of MFT comprise a resiliently mounted speaker cone connected to a voice coil, and a resiliently mounted magnetic assembly that provides a magnetic field in which the voice coil operates. The resiliently mounted magnetic assembly and the speaker cone can be driven to oscillate by applying signals to the voice coil. The magnetic assembly owing to its mass and the compliance of its mounting will oscillate at a relatively low frequency within the range of frequencies that are easily perceptible by tactile sensation. Alternatively, a separate vibrating device for providing tactile stimulation, and a separate speaker for generating audio are used.

Whether MFTs or separate audio and tactile transducers are used, for large size portable devices, in order to produce sufficient tactile force, it may be desirable to include multiple transducers. When multiple MFTs are used together, in spite of the fact that both may be receiving the same single frequency signal, an undesirable amplitude modulation of the response of the two MFTs has been observed.

Additionally, even when using a single MFT, or dedicated tactile vibration transducer, owing to manufacturing variances, the resonant frequency may vary to an extent that the performance variations, when using a predetermined frequency drive signal, may reach unacceptable levels.

In using a vibrating device to alert a user to some event, such as the receipt of a wireless communication message, an issue to be contended with is the limited power handling capacity of small vibrating devices that are suitably sized for inclusion in portable devices. In certain circumstances, such as when a user is in place with loud music or using an apparatus that also generates vibration, the stimulus generated by a small tactile alert may, in effect, be drowned out by other stimulus. Thus, it is important to maximize the stimulus that can be created by a small, relatively low power tactile alert.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
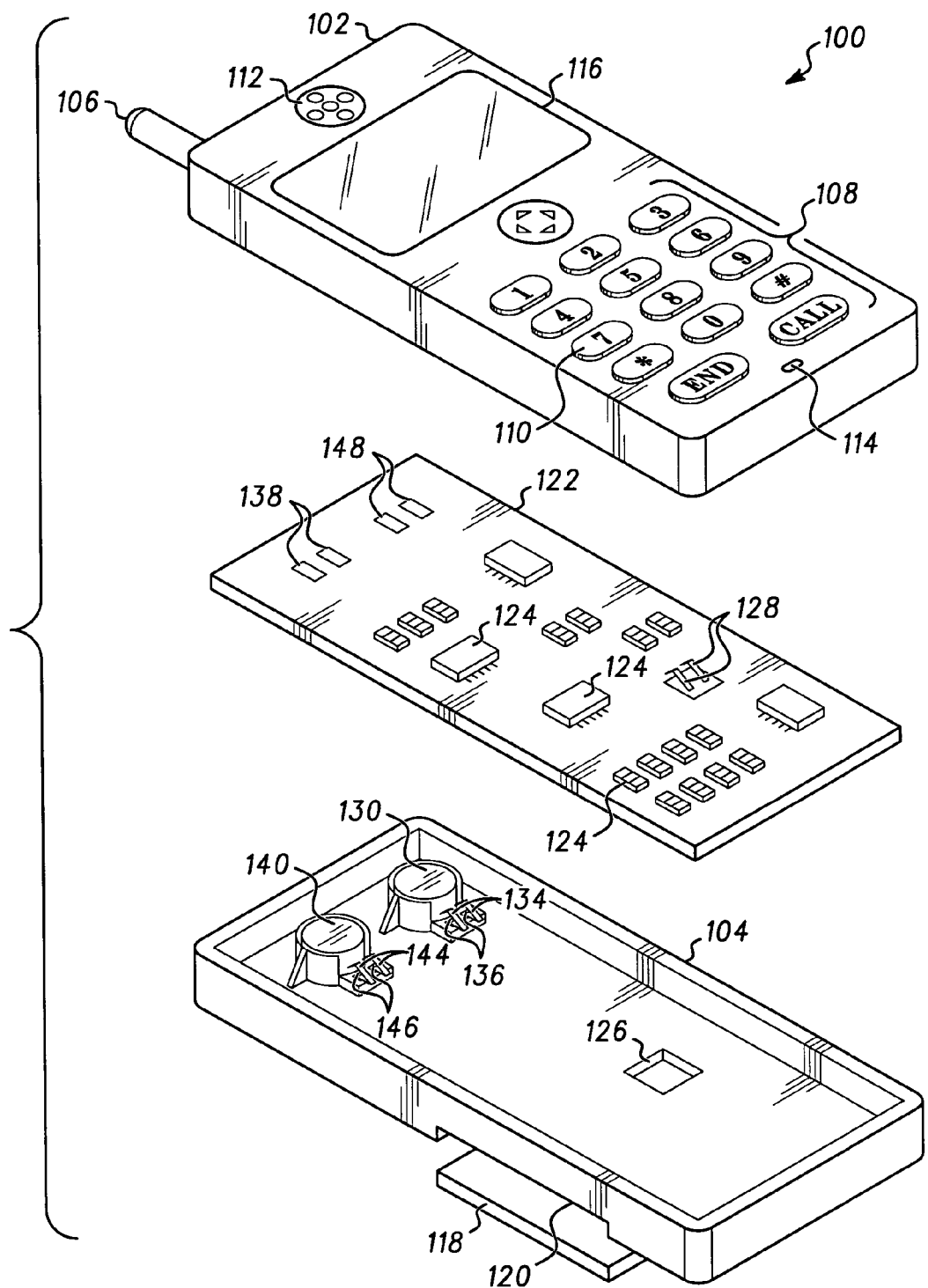
FIG. 1 is an exploded view of a cellular telephone according to a first embodiment of the invention.

FIG. 1 is an exploded view of a cellular telephone 100 according to a first embodiment of the invention. The cellular telephone 100 comprises, a front housing part 102, and a rear housing part 104. The front housing part 102 supports and antenna 106 and includes an array of openings 108 that accommodate keys of a keypad 110. A speaker grill 112 and a microphone grill 114 are also provided on the front housing part 102. A display opening 116 is also provided in the front housing part 102. A battery compartment cover 118 is provided for covering a battery compartment 120 in the rear housing part 104.

The front 102, and rear 104 housing parts enclose a circuit board 122. In FIG. 1 a back side of the circuit board 122 is visible. A plurality of electrical circuit components 124, that make up one or more electrical circuits of the cellular telephone 100 are mounted on the circuit board 122. Circuits of the cellular telephone 100 are more fully described below with reference to a functional block diagram shown in FIG. 2. The front side of the circuit board 122 (not shown), supports a display, and includes a plurality of pairs of open contacts, that are selectively bridged by conductive pads attached to keys of the keypad 110. An opening 126 from inside the rear housing part 104 into the battery compartment 120, provides access for spring loaded contacts 128 that are mounted on the circuit board 122, and make contact with contacts on a battery (not shown) held in the compartment 120.

A first multi-function transducer (MFT) 130 and a second MFT 140 are mounted in a first semi-cylindrical sleeve 132 and a second semi-cylindrical sleeve 142 that are integrally formed in the back housing part 104. The two MFTs 130, 140 can be nominally the same, although manufacturing tolerances generally lead to slightly different frequency responses e.g., different resonant frequencies. The two MFTs 130, 140 are advantageously operated in unison with the same drive signal. By using two MFTs 130, 140, higher amplitude vibration and audio can be generated.

A first pair of spring contacts 134 are coupled (e.g., by soldering) to a first pair of terminals 136 of the first MFT 130, and a second pair of spring contacts 144 are coupled to a second pair of terminals 146 of the second MFT 140. When the cellular telephone 100 is assembled the first pair of spring contacts 134, make contact with a third pair of contact terminals 138 on the circuit board 122, and the second pair of spring contacts 144 make contact with a fourth pair of contact terminals 148 on the circuit board 122. The MFTs 130, 140 are capable of emitting sound and are also capable of vibrating at frequencies within the range of tactile perception, and at sufficient amplitude to be perceptible by tactile perception. The MFTs 130, 140 can be used to output multimedia content including audio and vibration signals that are derived from a variety of sources including MIDI files, and compressed audio format files, e.g., .WAV, .MP3 files.

Figure 2:
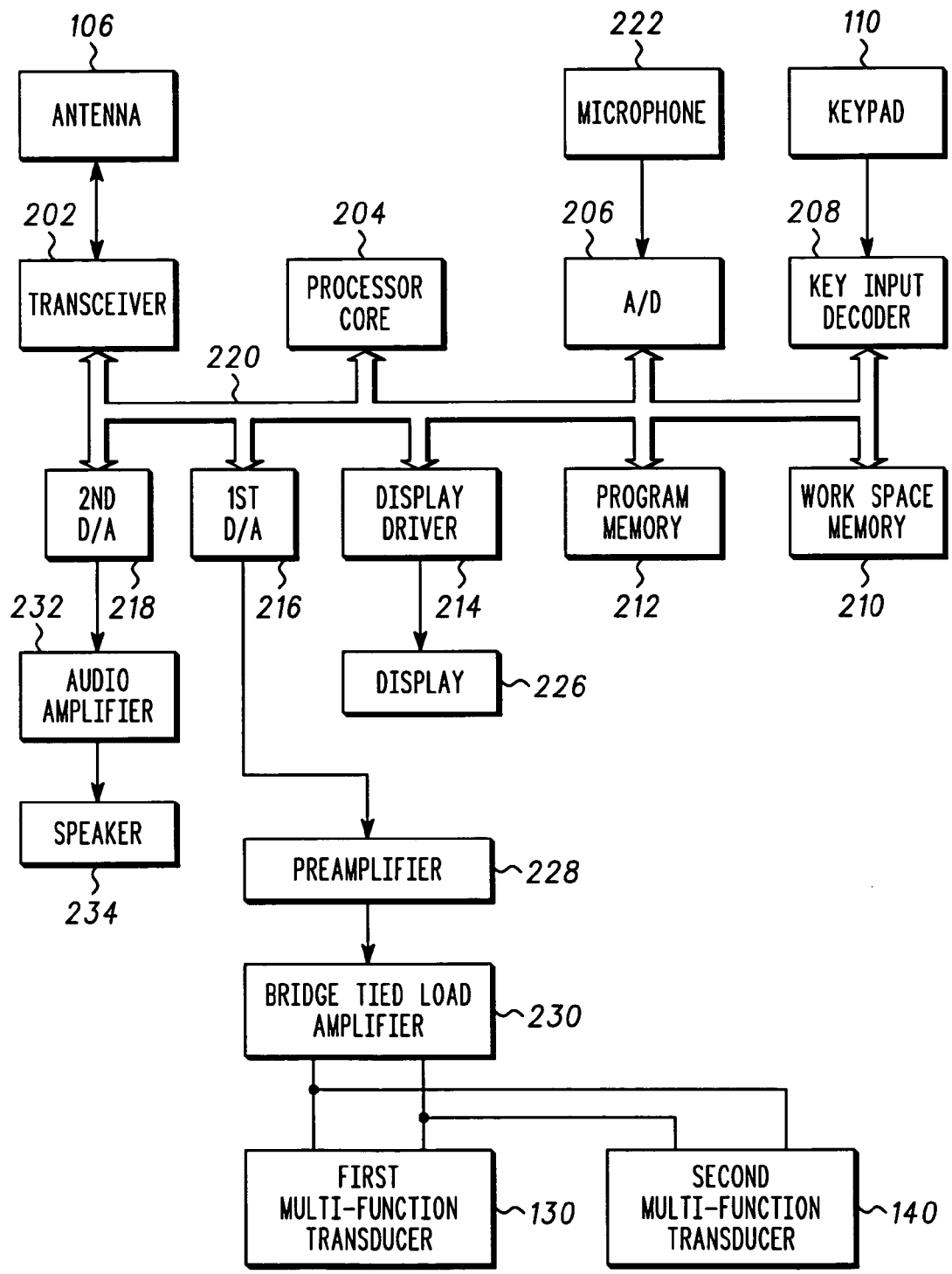
FIG. 2 is a block diagram of the cellular telephone shown in FIG. 1 according to the first embodiment of the invention.

FIG. 2 is a block diagram of the cellular telephone 100 shown in FIG. 1 according to the first embodiment of the invention. As shown in FIG. 2, the cellular telephone 100 comprises a transceiver module 202, a processor core 204, an analog to digital converter (A/D) 206, a key input decoder 208, a work space memory 210, a program memory 212, a display driver 214, a first digital to analog converter (D/A) 216, and a second D/A 218 coupled together through a digital signal bus 220.

The transceiver module 202 is coupled to the antenna 106. Carrier signals that are modulated by data, e.g., digitally encoded signals for driving the MFT or digitally encoded voice audio, pass between the antenna 106, and the transceiver 202.

A microphone 222 is coupled to the A/D 206. Audio, including spoken words, is input through the microphone 222 and converted to a stream of digital samples by the A/D 206.

The keypad 110 is coupled to the key input decoder 208. The key input decoder 208 serves to identify depressed keys, and provide information identifying each depressed key to the processor core 204. The display driver 214 is coupled to a display 226.

The first D/A 216 is coupled through a preamplifier 228, and a bridge tied load amplifier (BTL) 230 to the first MFT 130, and the second MFT 140. The BTL amplifier 230 provides a bipolar drive signal for the MFTs 130, 140. Optionally the preamplifier 228 is provided with a gain setting input that is coupled to the processor core 204 through the signal bus 220. The first D/A 216 converts pulse code modulation (PCM) digital signal samples to analog drive signals that are amplified by the preamplifier 228 the and BTL amplifier 230 and drive the first 130 and second 140 MFTs.

The second D/A 218 is coupled through an audio amplifier 232 to a speaker 232. The second D/A 212 converts decoded digital audio to analog signals and drives the speaker 232. The audio amplifier 232 may comprises a plurality of amplifiers.

One or more programs for processing data structures that include digitally encoded signals for driving the MFTs 130, 140 are stored in the program memory 212, and executed by the processor core 204. Data structures, e.g., pulse code modulation format files, that include digitally encoded drive signals for the MFTs 130, 140 are optionally preprogrammed into the program memory 212, or received through the transceiver 202.

The program memory 212 is also used to store programs that control other aspects of the operation of the cellular telephone 202. The program memory 212 is a form of computer readable medium.

The transceiver module 202, the processor core 204, the A/D 206, the key input decoder 208, the work space memory 210, the program memory 212, the display driver 214, the first D/A 216, the second D/A 218, the preamplifier 228, the BTL amplifier 230, the audio amplifier 232, and the digital signal bus 220, are embodied in the electrical circuit components 124 and in interconnections of the circuit board 122 shown in FIG. 1.

Figure 3:
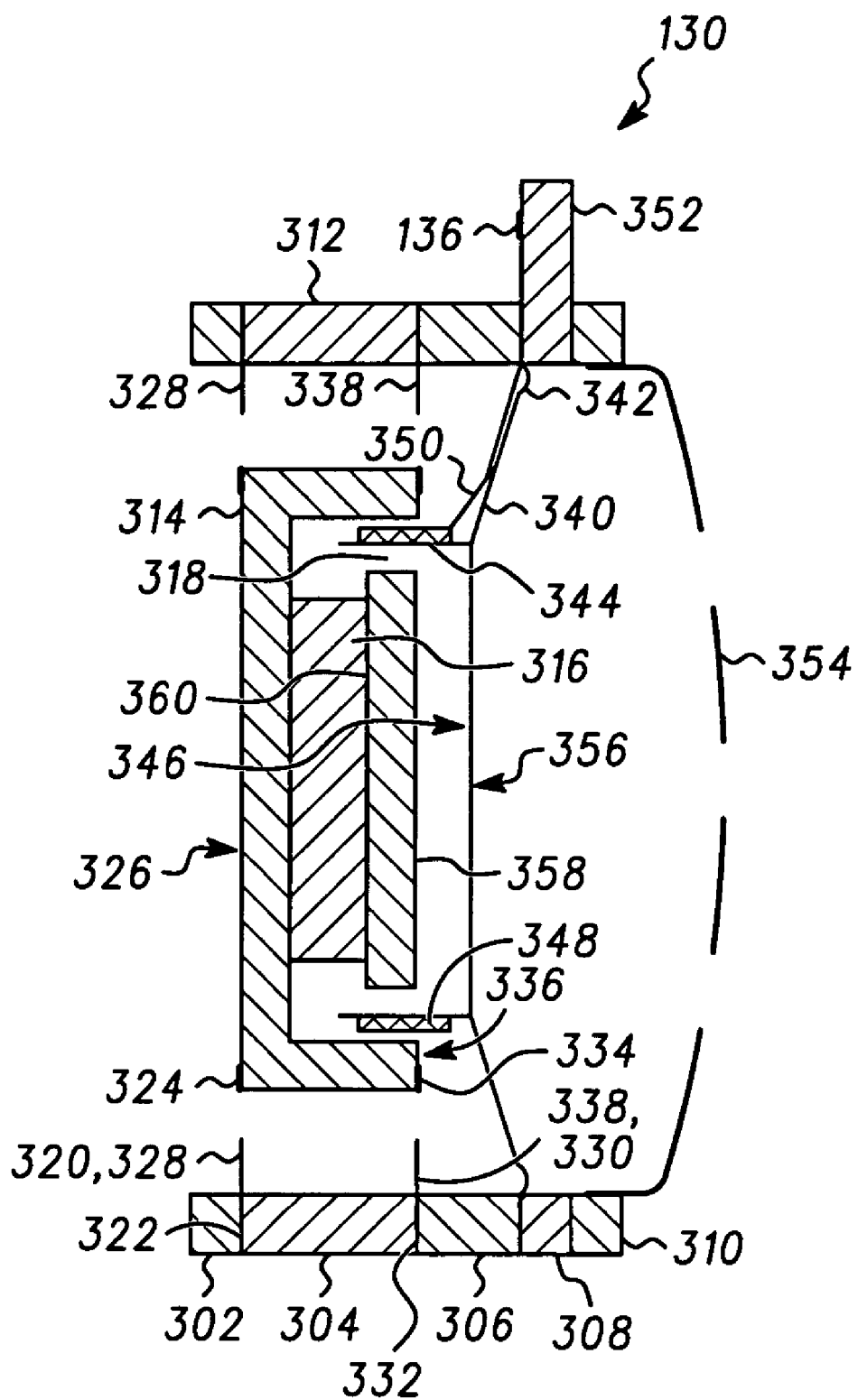
FIG. 3 is a diametral cross-sectional side view of a multifunction transducer used in the cellular telephone shown in FIGS. 1–2 according to the first embodiment of the invention.
Figure 4:
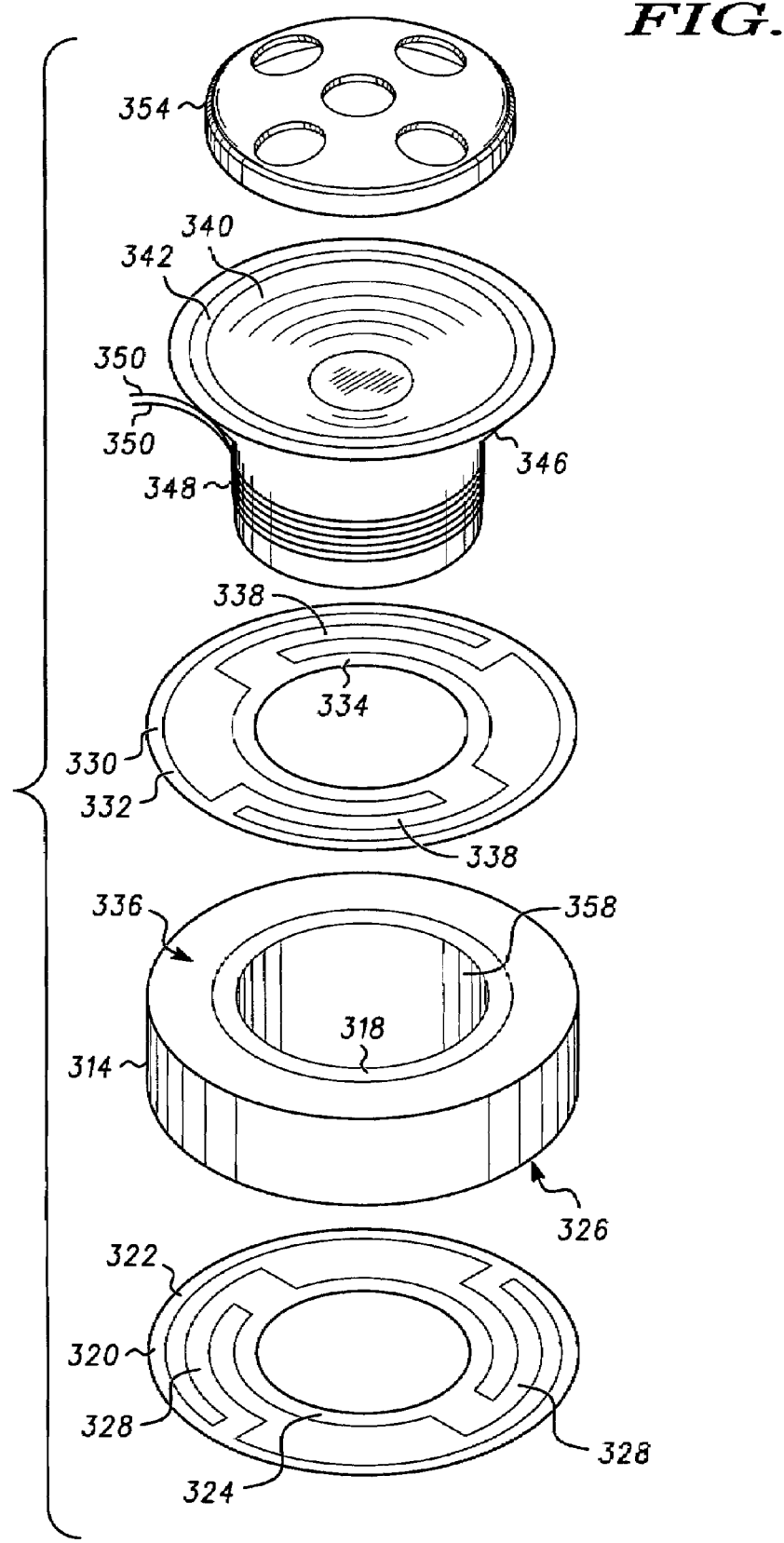
FIG. 4 is an exploded view showing internal components of the multifunction transducer shown in FIG. 3.

FIG. 3 is a diametral cross-sectional side view of the first MFT 130 used in the cellular telephone 100 shown in FIGS. 1–2 according to the first embodiment of the invention and FIG. 4 is an exploded view showing internal components of the MFT 130. The second MFT 140 can be of the same design as shown in FIGS. 3–4. A plurality of rings including a first ring 302, a second ring, 304, a third ring 306, a fourth ring 308, and a fifth ring 310 are bonded together to form a housing 312 of the first MFT 130. The five rings 302, 310 secure various other components of the first MFT 130 as will be described. A cup shaped ferromagnetic back plate 314 is located concentrically within the housing 312. A magnet 316 is bonded to and located concentrically within the cup shaped ferromagnetic back plate 314. A ferromagnetic pole piece 358 is bonded to the magnet 316. An outside diameter of the pole piece 358 is smaller than an inside diameter of the cup shaped back plate 314 so that there is an annular gap 318 between the cup shaped back plate 314, and pole piece 358. A magnetic field that comprises a strong radial component crosses the annular gap 318. The outside diameter of the pole piece 358 is larger than an outside diameter of the magnet 316 helping to direct the magnetic field radially in the annular gap 318.

A first spiral arm leaf spring 320 includes an outer ring 322 that is secured between the first 302, and second 304 rings of the housing 312, an inner ring 324 that is fixed (e.g., by spot welding) to a back surface 326 of the cup shaped back plate 314, and two spiral spring arms 328 that extend between the outer ring 322 and the inner ring 324. Similarly, a second spiral arm leaf spring 330 includes an outer ring 332 that is secured between the second 304, and third 306 rings of the housing 312, an inner ring 334 that is fixed (e.g., by spot welding) to a front surface 336 of the cup shaped back plate 314, and two spiral spring arms 338 that extend between the outer ring 332 and the inner ring 334. The magnet 316, pole piece 358, and back plate 314 make up a magnetic assembly 360. The magnetic assembly 360 is biased to a resting position by the first 320, and second 330 spiral arm leaf springs, which serve as a resilient support.

A speaker cone 340 is located concentrically in the housing 312. A speaker cone suspension 342 that is peripherally coupled to the speaker cone 340 is fixed between the third housing ring 306 and the fourth housing ring 308. The speaker cone suspension 342 is flexible to allow for axial movement of the speaker cone 340 in the housing 312. A cylindrical sleeve 344 is attached to a back surface 346 of the speaker cone 340. The cylindrical sleeve 344 is located in the annular gap 318. A voice coil solenoid 348 is wound on the cylindrical sleeve 344. Leads 350 of the voice coil solenoid 346 extend radially along the back surface 346 of the speaker cone 340, between the third 306 and fourth 308 housing rings and out to the terminals 136 of the first MFT 130 that are located on a radial extension 352 of the fourth housing ring 308. A perforated cover 354 is located in front of the speaker cone 340, and is secured (e.g., by press fitting) to the fifth housing ring 310. The speaker cone 340 comprises a front surface 356, which together with the back surface 346 serve to excite sound waves in a surrounding acoustic medium (e.g., air), when the speaker cone 340 is caused to oscillate.

In operation broadband oscillating signals including audio signals, and vibration signals, that are applied to the leads 350 of the voice coil solenoid 348 produce commensurate currents in the voice coil solenoid 348. Owing to the fact that the voice coil solenoid 348 is immersed in the magnetic field crossing the annular gap 318, the currents flowing in the voice coil result in commensurate Lorentz forces between the voice coil solenoid 350, and the magnetic assembly 360. At any given instant the Lorentz force urges the speaker cone 340, and the magnetic assembly 360 in opposite directions. In so far as oscillating signals are applied to voice coil solenoid the Lorentz forces are oscillatory and therefore induce the voice coil solenoid 350, and the magnetic assembly 360 to oscillate. The voice coil solenoid 350 serves as a transducer motor, that is to say an element that converts electrical signals to mechanical forces and motion, in the MFT 130.

The magnetic assembly 360, supported by the spiral arm leaf springs 320, 330, constitutes a first mechanical resonator that exhibits a first resonance characterized by a center frequency and a Quality (Q) factor. The center frequency of the first mechanical resonator can be adjusted by altering the total mass of the magnetic assembly 360 and by altering the resiliency of the spiral arm leaf springs 320, 330 using the formula for the resonant frequency of a simple harmonic oscillator (SHO) given in equation 1, as a guide.

$$Fo = \frac{1}{2\pi}\sqrt{\frac{k}{m}}$$ EQU. 1 where, k is the spring constant of the SHO; and
m is the mass of the SHO.

The center frequency of the first resonance can advantageously be between 120 and 180 Hz. Frequencies in the aforementioned range have been found to be useful in exciting vibrations that can be felt by users holding, or otherwise mechanically coupled to the cellular telephone 100. More particularly, the center frequency of the first resonance can advantageously be between about 140 and 160 Hz. Frequencies in the latter range have been found to be particularly efficacious.

The speaker cone 340 supported by the speaker cone suspension 342 forms a second resonator. The second resonator exhibits a second resonance that is characterized by a center frequency that is higher that the center frequency of the first resonance. However, the resonance of the second resonator is highly damped by excitation of the sound waves by the speaker cone 340, and thus the speaker cone 340, voice coil solenoid 348 system is able to operate effectively over a broad range of frequencies, to generate sound waves.

For larger portable devices, it is desirable to include two MFTs, as shown in FIG. 1, in order to produce a large vibration force on the portable device in order to provide increased haptic stimulation. Owing to manufacturing variances, there may be a slight difference between the first resonance for the first MFT 130, and of the second MFT 140. Such manufacturing variances can be controlled to the extent that there will be substantial overlap between the response curve of two MFTs, and a sinusoidal drive signal at a frequency within the Full Width at Half Max (FWHM) of both MFTs first resonance can be chosen. When driving two MFTs with such a sinusoidal drive signal, it is to be expected that there may be a phase difference between the responses of the two MFTs. However, in practice, a more problematic phenomenon occurs when driving two MFTs with a common sinusoidal signal. In particular, the time domain response of a system of two MFTs driven by a common sinusoid has been observed by the inventors to exhibit a phenomenon that resembles the beating together of two signals that are closely spaced in frequency, notwithstanding the fact that a single sinusoid is used as the drive signal. Methods and apparatus for addressing this phenomenon are described further below with reference to FIGS. 5-15.

Figure 5:
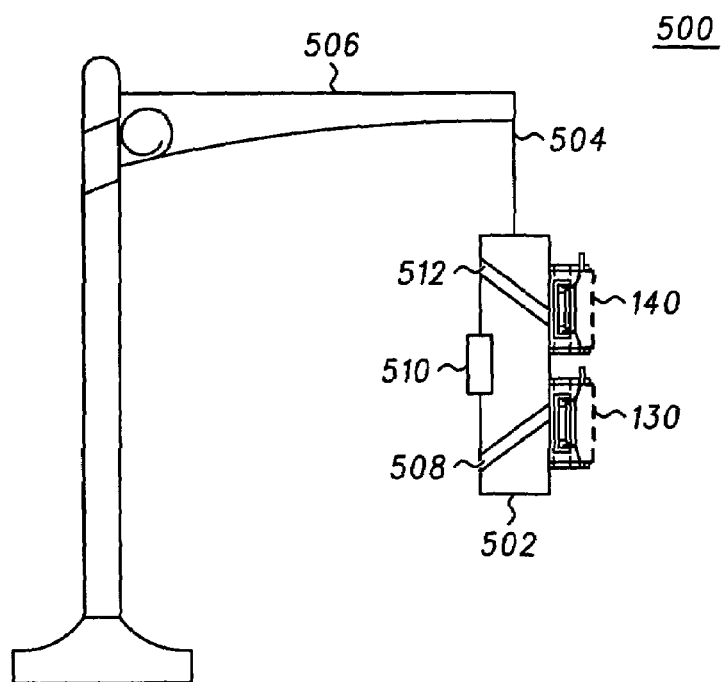
FIG. 5 is a schematic of an apparatus for testing the response of two multifunction transducers of the type shown in FIGS. 3–4.

FIG. 5 is a schematic of an apparatus 500 for testing the response of two MFTs of the type shown in FIGS. 3-4. The testing apparatus 500 comprises a test mass 502, suspended by a wire 504 from a support stand 506. The two MFTs 130, 140 are attached to the test mass 502 such that the axes of motion of the parts of the MFTs 130, 140 (e.g., magnetic assembly 260, and speaker cone 240) is perpendicular to the wire 504. A first vent hole 508 that extends from behind the first MFT 130 through the test mass 502 out to the atmosphere prevents the development of back pressure behind the first MFT 130. Similarly, a second vent hole 512 extends from behind the second MFT 140 out to the atmosphere. An accelerometer 510 is attached to the test mass 502 opposite the MFTs 130, 140. The accelerometer 510 is oriented so as to measure acceleration along the axis of motion of the parts of the MFTs 130, 140. Test leads (not shown) are attached to the MFTs 130, 140 for applying a drive signal, and test leads (not shown) are attached to the accelerometer 510 for collecting accelerometer data. The test leads should be arranged to hang freely while testing the MFTs 130, 140. A test mass 502 that weighed 100 grams and a 50 centimeter wire 504 has been used in performing tests on two MFTs.

Figure 6:
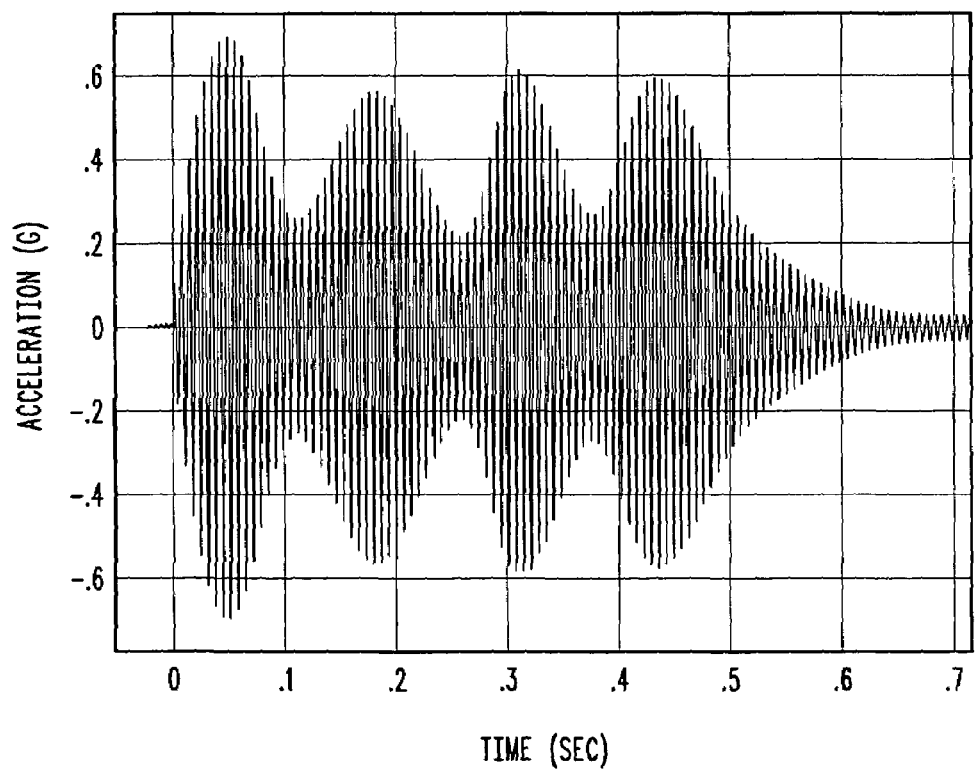
FIG. 6 is plot of the time domain response of a system of two multifunction transducers when driven with a sinusoidal drive signal.

FIG. 6 is plot of the time domain response of a system of two multifunction transducers when driven with a single frequency sinusoidal drive signal. The abscissa is marked off in seconds, and the ordinate is marked off in g's. The single frequency sinusoidal drive signal was applied for 300 milliseconds. As shown in FIG. 6 the system exhibits an uncontrolled beat like amplitude modulation. It is not known definitively why the beat like amplitude modulation occurs. It is an undesirable effect due to the fact that it is uncontrolled. The amplitude modulation shown in FIG. 6 is characterized by a modulation depth of about 50% relative to the peak amplitude of the response.

Figure 7:
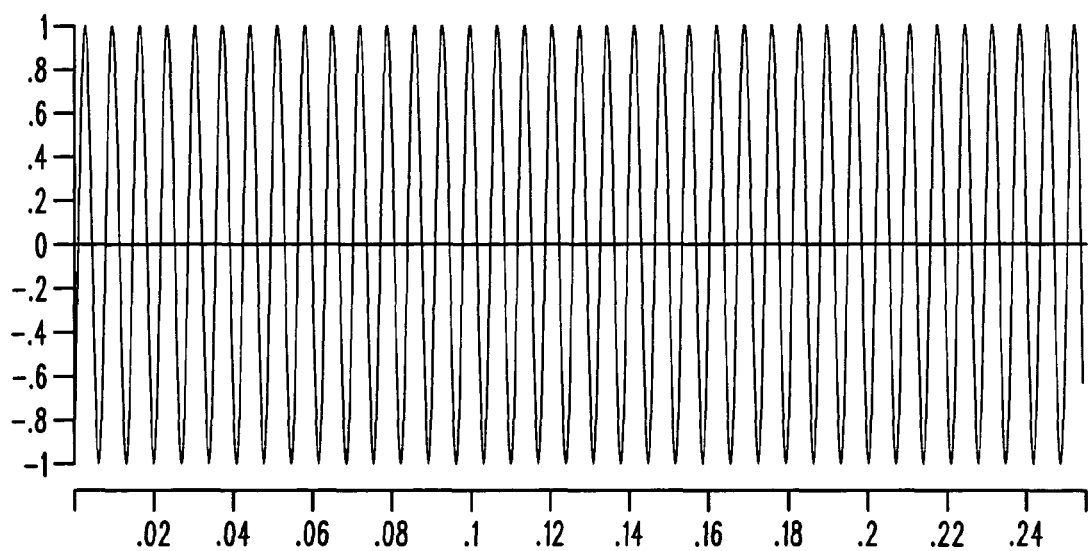
FIG. 7 is a nearly constant RMS multi frequency component drive signal.
Figure 8:
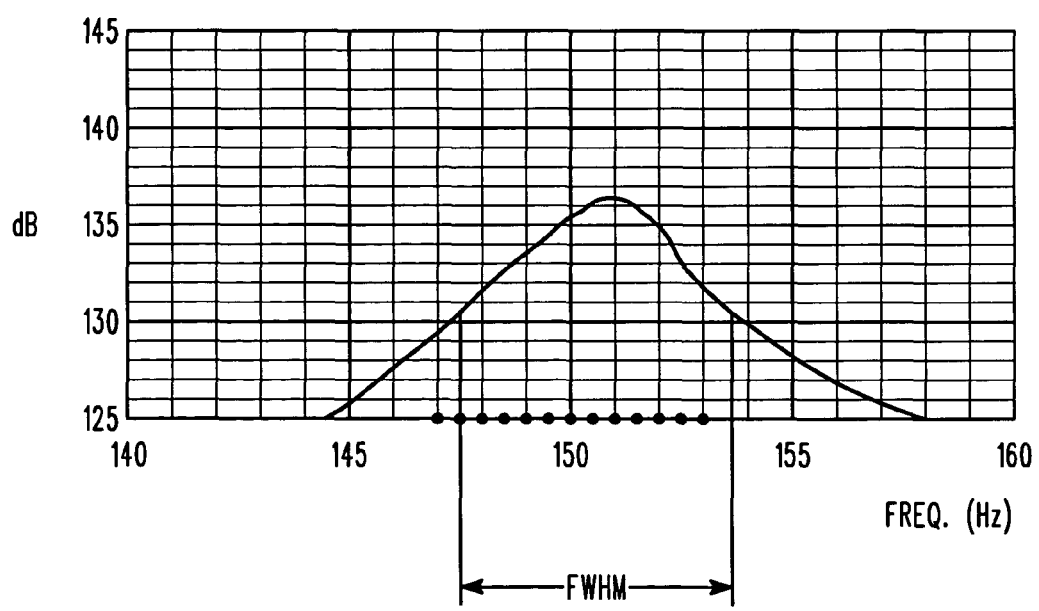
FIG. 8 shows the vibration response as a function of frequency of a single multifunction transducer of the type shown in FIGS. 2–3.

FIG. 7 is a nearly constant root-mean-square (RMS) multi frequency component drive signal. The drive signal includes a plurality of small bandwidth components. Each component is characterized by an amplitude, a center frequency, and a phase. The amplitudes of the frequency components can be equal. FIG. 8 shows the vibration response as a function of frequency of a single multifunction transducer of the type shown in FIGS. 3–4. In FIG. 8, the abscissa is marked off in Hertz, and the ordinate in Decibels of acceleration. The vibration response shown in FIG. 8 is characterized by a center frequency, which in the particular case of the response curve shown in FIG. 8 is about 151 Hz, and a Full Width at Half Max (FWHM), which is indicated in FIG. 8. The FWHM is about 6 Hz. Note that due to manufacturing variance the center frequency, and the FWHM may vary somewhat. The nominal design frequency of the MFT for which the response is shown in FIG. 8 is 150 Hz, 1 Hz from the actual center frequency of 151 Hz. An exemplary set of center frequencies of the components of the drive signal shown in FIG. 7 are indicated by dark circles on the abscissa of FIG. 8. In the drive signal shown in FIG. 7, each component signal, has a bandwidth of about 2 Hz. The drive signal can comprise a plurality of components within the FWHM range of the frequency response. Providing multiple frequency components within the FWHM range reduces variations in the response of MFTs due to variations of the MFTs frequency response. Additionally, as described further below, multi frequency component drive signals reduce the modulation depth of the undesired beat like amplitude modulation that occurs when driving a system of two or more MFTs such as shown in FIG. 6.

Note that the drive signal shown in FIG. 7 has a relatively low crest factor. The crest factor of a signal is defined as the ratio of the peak amplitude to the RMS of the signal. The crest factor can be less than 0.5 dB. Alternatively, in lieu of using a multi-frequency component signal in which each component has a finite bandwidth, a multi frequency component signal in which each frequency component is a pure sinusoidal (delta function spectrum) is used. The crest factor of a multi-sine drive signal is dependent on the relative phases of the frequency components that make up the multi-sine signal. Various prescriptions and algorithms for selecting the relative phases of a multi-sine signal in order to obtain a relatively low crest factor are known. These known prescriptions and algorithms for selecting the relative phases are advantageously applied in determining the phases of the components of multi-sine signals used to drive MFTs. Examples of scientific literature that describes prescriptions and methods for choosing the phases of components of a multi-sine in order to obtain a multi-sine with a low crest factor include: Schroeder, M. R. (1970) *Synthesis of Low-Peak-Factor Signals and Binary Sequences with Low Autocorrelation*, IEEE Trans. Info. Theory. IT-16:85–89; Guillaume, P., Schoukens, J., Pintelon, R, & Kollar, I. (1991) *Crest-Factor Minimization Using Nonlinear Chebyshev Approximation Methods*, IEEE Trans. Instr. Measurements 40(6): 982–989; Schoekens, J., Rollain, Y. and, Guillaume, P. (1996), *Design of Narrowband, High-Resolution Multi-sines*, IEEE Trans. Instr. Measurement 45(2): 750–753; Vo, B-N., Cantoni, A., Teo, K. L. (2001) *Filter Design with Time Domain Mask Constraints*. Kluwer, Dordrecht, ISBN 0-7923-7138-0; and Rivera, D. E., Braun, M. W., and Mittleman, H. D. (2002) *Constrained Multisine Inputs for Plant-Friendly Identification of Chemical Processes*, Presented at 2002 IFAC World Congress, Barcelona, Spain, 21–27 Jul. 2002. Alternatively, rather than using the methods and prescriptions described in the foregoing, to achieve a low crest factor, the methods and prescriptions can be altered to determine phases of components of a multi-sine that minimize the difference between a prescribed envelope function, such as described below with reference to FIGS. 13–14, and table 1, and the envelope of the multi-sine.

Alternatively, a signal that has a continuous spectrum with substantial spectral energy distributed through at least a substantial portion of the FWHM of at least one MET to be driven is used.

Figure 9:
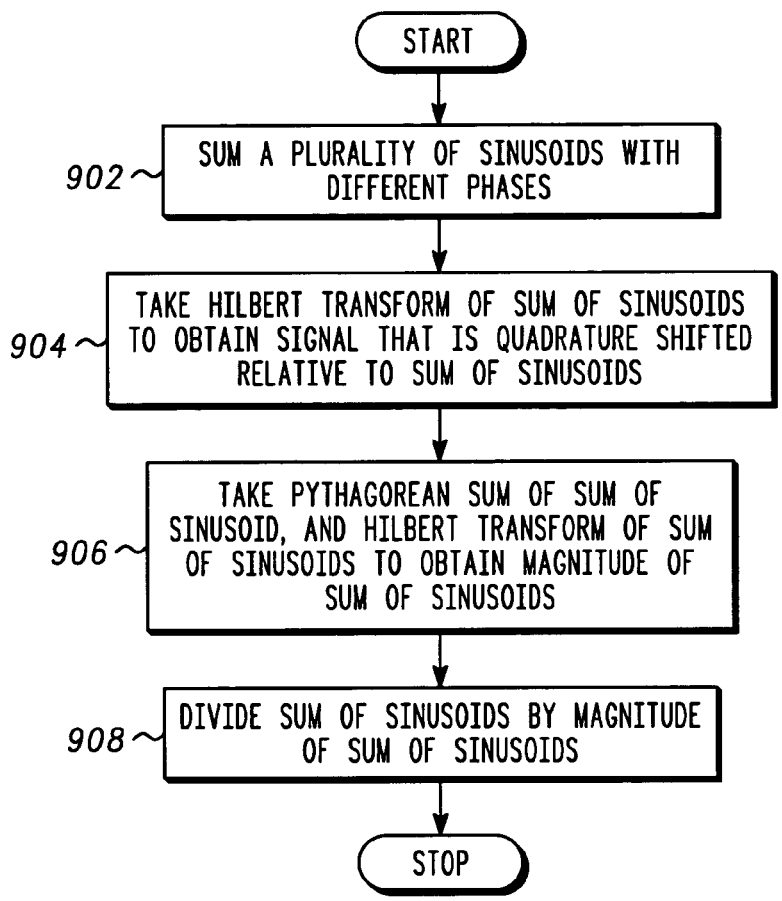
FIG. 9 is a flow chart of a method synthesizing a signal for driving a system of two multifunction transducers.

FIG. 9 is a flow chart of a method synthesizing a signal for driving a system of two METs according to an embodiment of the invention. In step 902 the sum of a plurality of sinusoids is taken. The sum of sinusoids can advantageously take the following form:

EQU. 1:

$$\text{Sum} = \sum_{k=1}^{N} \sin\left(2\pi t\left(Fl + \frac{k(Fh-Fl)}{N}\right) - \phi_k\right)$$

where, t is time;
Fl is a lower frequency bound,
Fh is an upper frequency bound,
N is a number of frequency components, and
$\phi_k$ a frequency dependent phase is given by the recursive relation:

$$\phi_k = \phi_{k-1} - \frac{\pi k^2}{N} \quad \text{EQU. 2}$$

where, $\phi_1 = \pi/2$

Although it is generally preferred that the phase of each frequency component in the sum be different, phases different from what is specified in equation 2 are alternatively used. One need not use the exact relation specified in EQU. 2.

The sum of sinusoids, can advantageously include a number of components that are spaced close enough in frequency that a plurality of the frequency components will fall within the FWHM of MFTs to be driven by the signal obtained by the method.

Figure 10:
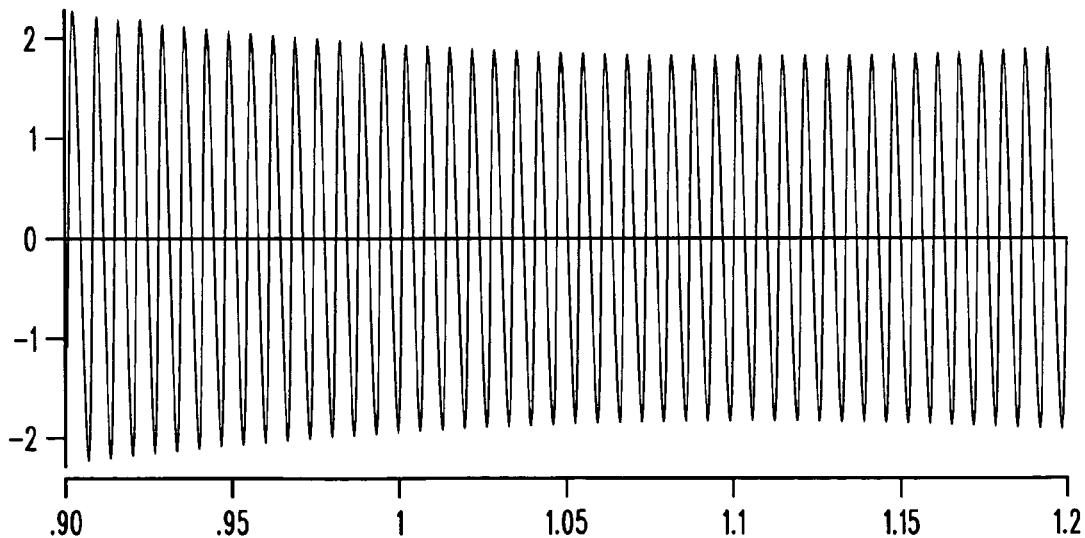
FIG. 10 is a plot of the sum of twelve sinusoids that are evenly spaced in frequency.

FIG. 10 is a plot of the sum of 12 evenly spaced sinusoids ranging from a lower bound Fl of 147 Hz to an upper bound Fh of 153 Hz., with phases selected per equation 2. The plot shown in FIG. 10 ranges from t=0.9 to t=1.2 seconds. Note that the sum shown in FIG. 10 is characterized by a time-varying envelope.

Referring again to FIG. 9 in step 904 the Hilbert transform is applied to the sum of the sinusoids taken in step 902. Applied to sinusoids, the Hilbert transform amounts to the replacement of sine operators with cosine operators. The result of applying the Hilbert transform to the sum given of sinusoids given by equation 1 is:

$$\text{Hilbert(Sum)} = \sum_{k=1}^{N} \cos\left(2\pi t\left(Fl + \frac{k(Fh - Fl)}{N}\right) - \phi(k)\right) \quad \text{EQU. 3}$$

Figure 11:
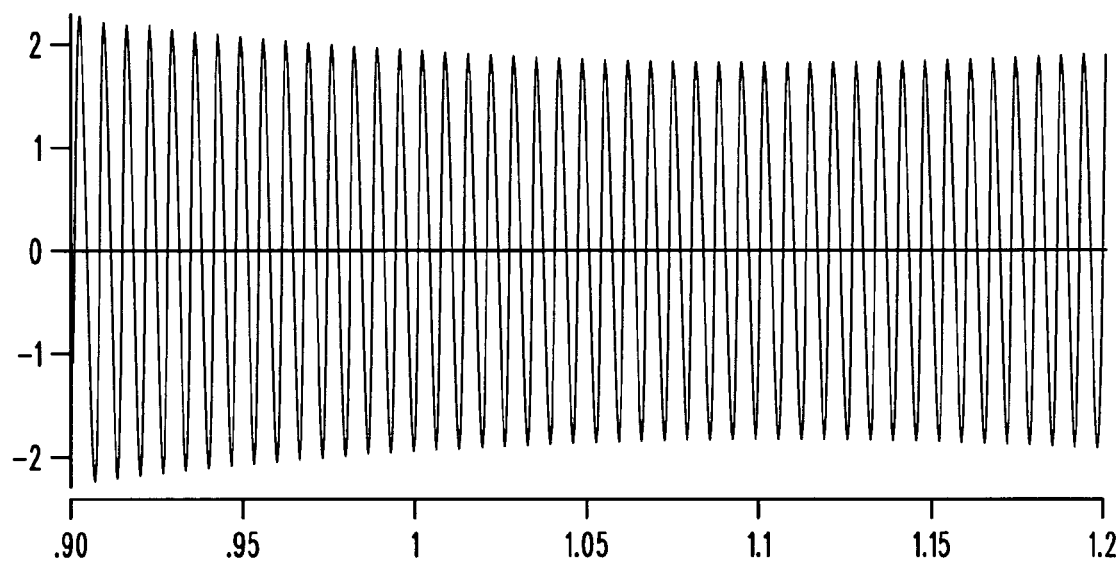
FIG. 11 is a plot of the result of applying the Hilbert transform to the signal shown in FIG. 10.

The result of the Hilbert transform is a signal that has a quadrature phase shift relative to sum of the sinusoids. FIG. 11 is a plot of the result of applying the Hilbert transform to the signal shown in FIG. 10.

Referring again to FIG. 9, in step 906 the Pythagorean sum of the sum of the sinusoids, and the Hilbert transform of the sum of the sinusoids is taken to obtain the magnitude of the sum of the sinusoids. The magnitude of the sum of the sinusoids is given by:

$$\text{Magnitude} = \left(\left(\sum_{k=1}^{N} \sin\left(2\pi t\left(Fl + \frac{k(Fh - Fl)}{N}\right) - \phi(k)\right)\right)^2 + \left(\sum_{k=1}^{N} \cos\left(2\pi t\left(Fl + \frac{k(Fh - Fl)}{N}\right) - \phi(k)\right)\right)^2\right)^{1/2}$$

Figure 12:
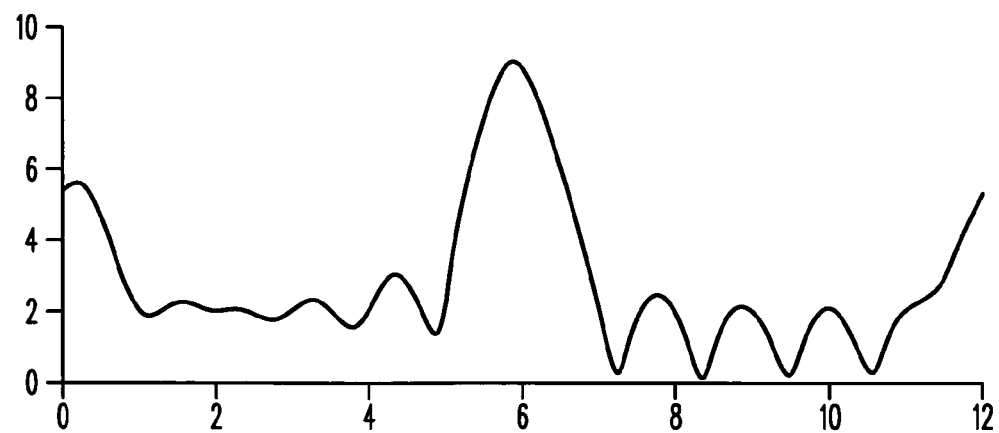
FIG. 12 is the plot of the magnitude of the signal shown in FIG. 10.

FIG. 12 is the plot of the magnitude of the signal shown in FIG. 10. The plot shown in FIG. 12 ranges from t=0 to t=12. Note, the variation of the magnitude over the range shown in FIG. 12.

Referring again to FIG. 9 in step 908 the sum of the sinusoids taken in step 902 is divided by the magnitude of the sum of the sinusoids obtained in step 906. Step 908 yields the signal shown in FIG. 7, that is characterized by a low crest factor, and is advantageously used for driving a system of two or more MFTs in order to reduce the aforementioned uncontrolled amplitude modulation, and is suitable for driving one or more of a population of MFTs that has frequency response that varies somewhat from device to device in order to reduce the variance of response within the population.

Generally, an MFT of a particular size and design has a maximum steady state vibration drive signal handling capacity that can not be exceeded without causing mechanical interference at the limits of the range of movement of parts of the MFT, damage to the MFT, and/or distortion of audio that is applied simultaneously with signals intended to excite vibration of the MFT. Additionally, in respect to tactile vibration stimulus, it has been determined that the perceived stimulus of vibration caused by an MFT, is highly dependent on the initial force amplitude when an MFT is initially driven to produce tactile stimulus. In other words the temporal contrast of tactile stimulus is important in determining the perceived magnitude of the stimulus of tactile vibration stimulus. According to an embodiment of the invention, by carefully controlling signal amplitude, as described below in more detail, an MFT is initially driven with a signal that greatly exceeds the steady state capacity, in order to rapidly add energy to vibration of the MFT, and cause an enhanced tactile stimulus.

Figure 13:
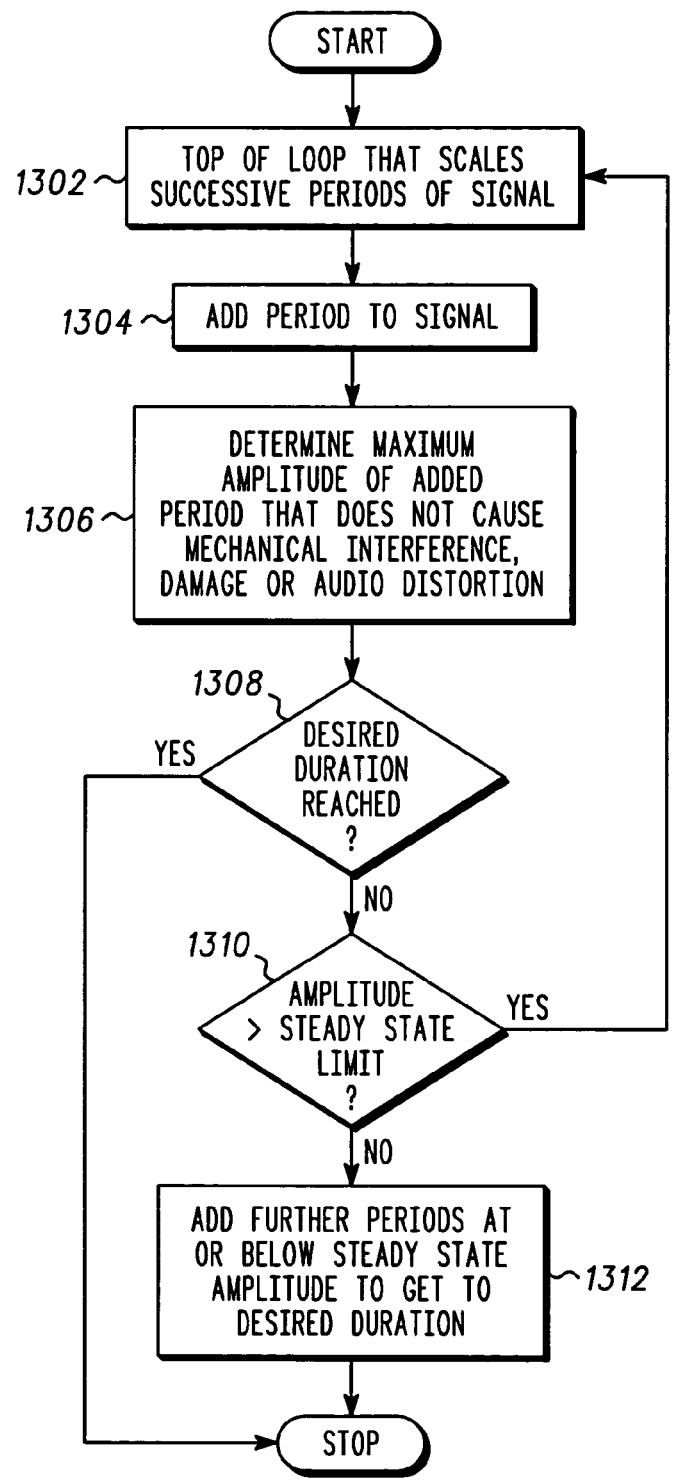
FIG. 13 is a flow chart of a method of generating a signal for driving an MFT to achieve an enhanced stimulus.

FIG. 13 is flow chart of a method of generating a signal for driving an MFT in order to obtain a large tactile stimulus effect, given a limited maximum capacity of the MFT to be driven. As input, the method shown in FIG. 13 accepts a signal such as shown in FIG. 7. The method scales the amplitude of successive "periods" of the input signal. As used in this context a period is taken as a portion of the input signal between two zero crossings that are separate by another zero-crossing. Block 1302 is the top of loop that considers successive periods of the signal. In block 1304 a period is added to the signal. In block 1306 the maximum amplitude of the added period that does not cause mechanical interference in the MFT, damage to the MFT, or distortion of audio that is simultaneously applied to the MFT is determined. Block 1306 can be accomplished by trying different amplitudes for the newly added period. Some margin of safety may be allowed for in determining the maximum amplitude in block 1306. Note that the first time that block 1306 is executed, the maximum amplitude for a first signal period is determined. Block 1308 is a decision block the outcome of which depends on whether a desired signal duration has been reached by adding the period in block 1304. If so, the method stops. If the desired signal duration has not been reached, then process continues with decision block 1310, the outcome of which depends on whether the amplitude determined in block 1306 exceeds the steady state signal amplitude limit of the MFT. If the signal amplitude of the lasted added period exceeds the steady state signal amplitude, then the method loops back to block 1310 and the method continues as previously described. If on the other hand the maximum steady state signal amplitude has been reached, then in block 1312 one or more further signal periods, at the maximum steady state signal amplitude or below in order to bring the signal to the desired duration.

Table 1 shows the results of applying the method shown in FIG. 13 to a MFT similar to that shown in FIGS. 3–4. The first column of Table 1 enumerates signal periods, as defined above, counting from the start of the signal. The second column indicates the signal amplitude in volts, as determined in each iteration of block 1306. Note that the voltage for the first period is greater than three times the maximum steady state signal capacity of the tested MFT. Initially before the amplitude of the vibration resonance of the MFT, has been built up, the MFT is able to tolerate this high driving signal amplitude. Providing this high signal amplitude serves to increase the tactile stimulus caused by the initial movement of the MFT. With each successive period as more energy is stored in the vibration resonance of the MFT, the maximum driving signal that the MFT can tolerate declines. In the case of MFTs that have been tested, the decline has been observed to approximate an exponential decay.

TABLE 1

| "PERIOD" | AMPLITUDE (VOLTS) |
|---|---|
| $1^{st}$ | 1.42 |
| $2^{nd}$ | 1.19 |
| $3^{rd}$ | 1.0 |
| $4^{th}$ | .844 |
| $5^{th}$ | .710 |
| $6^{th}$ | .626 |
| $7^{th}$ | .55 |
| $8^{th}$ | .486 |
| $9^{th}$ | .418 |
| Steady State | .376 |

Figure 14:
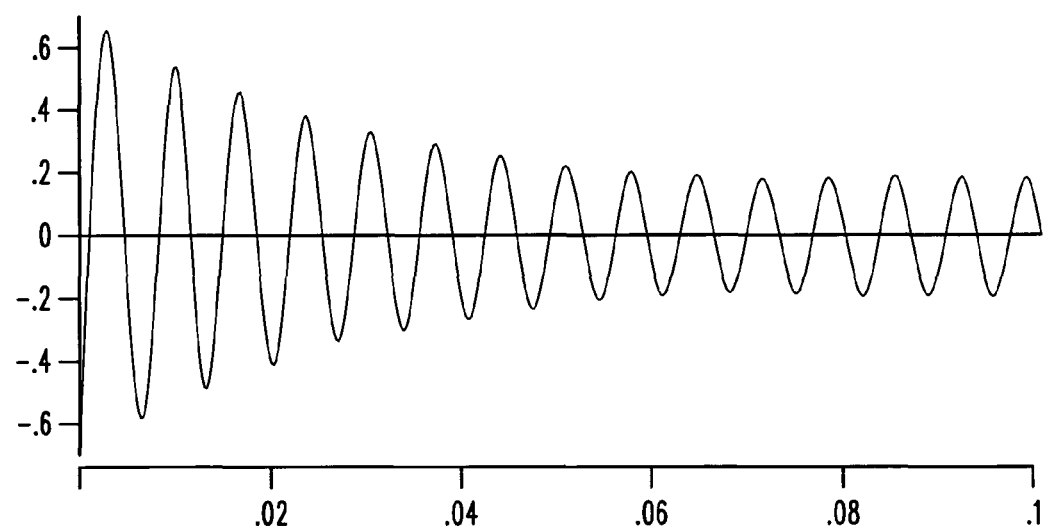
FIG. 14 is an amplitude modulated drive signal derived from the multi frequency component signal shown in FIG. 7, according to the method shown in FIG. 13.

FIG. 14 is an amplitude modulated drive signal derived from the multi frequency component signal shown in FIG. 7, according to the method shown in FIG. 13.

Figure 15:
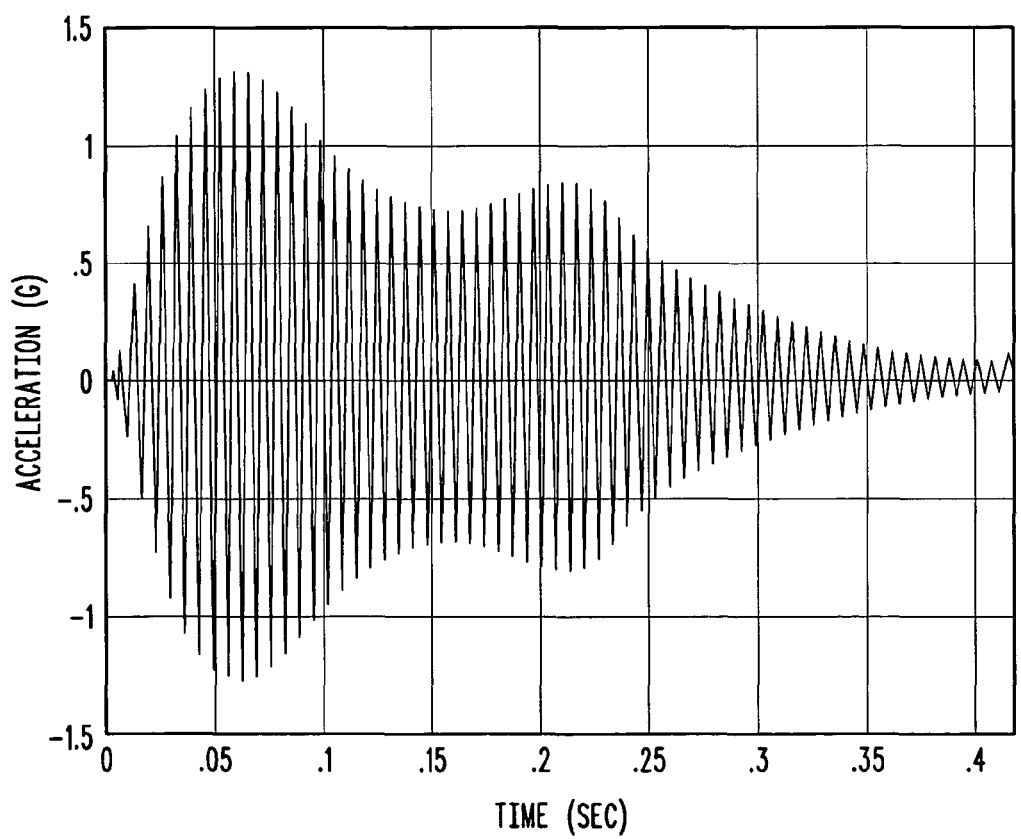
FIG. 15 is a plot of the time domain response of a system of two multifunction transducers when driven with of the type shown in FIG. 14.

FIG. 15 is a plot of the time domain response of a system of two MFTs when driven with a signal of the type shown in FIG. 14. In FIG. 15, the abscissa indicates time in seconds, and the ordinate indicates acceleration in g's. Note that the vibration amplitude reaches a relatively high level of 1.3 g's in 60 Milliseconds. This abrupt onset of relatively high magnitude g's is highly effective in providing tactile stimulus to a user that is in contact with the cellular telephone or other device including the system of two MFTs. The abrupt onset is due to the use of high signal amplitudes that exceed the maximum steady capacity for one or more signal periods.

Note also that the modulation depth of the beat-like amplitude modulation is also reduced relative to that shown in FIG. 6. The reduction in the uncontrolled amplitude modulation is associated with the inclusion, in the driving signal, of multiple frequency components within the FWHM of the MFTs.

According to an embodiment of the invention, in using a signal such as shown in FIG. 14 to alert a user the signal is repeated several times, with intervening periods of sufficient duration for the vibrations of the MFT to substantially attenuate.

Although the invention has been described above with reference to cellular telephone 100, it is noted that the invention is applicable to a wide variety of handheld electronic devices, including but not limited to personal digital assistants, and portable game consoles.

While specific embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A portable electronic apparatus comprising:
   a plurality of vibration transducers each comprising a mass, and a transducer motor coupled to the mass and adapted to impart motion to the mass in response to electrical signals applied to the transducer motor;
   an electrical circuit coupled to each transducer motor, wherein the electrical circuit is adapted to apply a multi-sine signal to each transducer motor, the multi-sine signal phase to produce signals which when applied to the plurality of transducers prevent destructive interference between the plurality of transducers.

2. The portable electronic apparatus according to claim 1 wherein:
   the electrical circuit is adapted to apply an amplitude modulated multi-sine signal to each transducer.

3. The portable electronic apparatus according to claim 2 wherein:
   the electrical circuit is adapted to apply a multi-sine that, considered without any predetermined applied amplitude modulation, is characterized by a crest factor of less than 0.5 dB.

4. The portable electronic apparatus according to claim 1, wherein a common multi-same signal is applied a plurality of transducer motors.

* * * * *